United States Patent
Shin (10) Patent No.: US 8,527,005 B2
(45) Date of Patent: Sep. 3, 2013

(54) MULTI-STANDBY MOBILE TERMINAL AND OPERATION METHOD FOR THE SAME

(75) Inventor: Sang Min Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 126 days.

(21) Appl. No.: 13/073,500

(22) Filed: Mar. 28, 2011

(65) Prior Publication Data

US 2011/0237297 A1     Sep. 29, 2011

(30) Foreign Application Priority Data

Mar. 26, 2010  (KR) .......................... 10-2010-0027292

(51) Int. Cl.
*H04W 88/02*   (2009.01)
(52) U.S. Cl.
USPC ........................................ 455/558; 455/414.1
(58) Field of Classification Search
USPC ................... 455/412.1, 414.1, 417, 418, 558
See application file for complete search history.

(56) References Cited

U.S. PATENT DOCUMENTS

2009/0104939 A1    4/2009 Lee
2011/0263296 A1*  10/2011 Baietto et al. ................. 455/558

FOREIGN PATENT DOCUMENTS

| KR | 1020040003222 | 1/2004 |
| KR | 1020090012951 A | 2/2009 |
| KR | 1020090039896 | 4/2009 |

* cited by examiner

*Primary Examiner* — Sam Bhattacharya
(74) *Attorney, Agent, or Firm* — The Farrell Law Firm, P.C.

(57) ABSTRACT

A multi-standby mobile terminal and an operation method for the same are provided. The multi-standby mobile terminal includes at least two communication modules and a plurality of SIM cards. A number of SIM cards is greater than a number of communication modules. When a call is established over a communication network related to a first SIM card, it is determined whether a second SIM card is associated with a first communication module that is associated with the first SIM card. When a second SIM card is associated with the first communication module associated with the first SIM card, SIM association transfer is performed by disassociating the second SIM card from the first communication module and then associating the second SIM card with a second communication module, and proceeding to handle the call.

11 Claims, 5 Drawing Sheets

MULTI-STANDBY MOBILE TERMINAL AND OPERATION METHOD FOR THE SAME

PRIORITY

This application claims priority under 35 U.S.C. 119(a) to an application filed in the Korean Intellectual Property Office on Mar. 26, 2010, and assigned Serial No. 10-2010-0027292, the contents of which are incorporated herein by reference.

BACKGROUND OF THE INVENTION

1. Field of the Invention

The present invention relates generally to a communication terminal and, more particularly, to a multi-standby mobile terminal and an operation method for the same.

2. Description of the Related Art

Modern mobile terminals provide diverse functions. In particular, recently developed multi-mode mobile terminals can receive services from two or more different mobile communication networks. For example, dual-mode mobile terminals may receive communication services from a Wideband Code Division Multiple Access (WCDMA) network and a Global System for Mobile communications (GSM) network, a Code Division Multiple Access (CDMA) network and another CDMA network, or a GSM network and another GSM network. Such a dual-mode mobile terminal may access one of two mobile communication networks according to a user's selection. Switching between two mobile networks in the dual mode terminal is not necessarily a simple operation.

Multi-standby mobile terminals have been developed that can simultaneously communicate with at least two communication networks. For example, dual-standby mobile terminals can simultaneously communicate with a WCDMA network and a GSM network, two WCDMA networks, or two GSM networks. Such a dual-standby mobile terminal may identify channels by receiving preamble or pilot signals from base stations of the WCDMA network and GSM network.

A multi-standby mobile terminal may include a single communication processor to access at least two communication networks. When the multi-standby mobile terminal with a single communication processor is engaged in a call with one of the at least two communication networks, it may be unable to access the remaining communication networks. More specifically, when a multi-standby mobile terminal having a single communication processor is engaged in a call with one communication network, it may fail to receive a service from another communication network.

A multi-standby mobile terminal may include at least two communication processors to access at least two communication networks. Although such a multi-standby mobile terminal with multiple communication processors may effectively receive services from multiple communication networks at the same time, miniaturization of the multi-standby mobile terminal is difficult. This problem is exacerbated as the number of communication networks to be used increases.

SUMMARY OF THE INVENTION

The present invention has been made to address at least the above problems and/or disadvantages and to provide at least the advantages described below. Accordingly, the present invention provides a method that enables miniaturization and effective operation of a multi-standby mobile terminal.

According to one aspect of the present invention, an operation method is provided for a multi-standby mobile terminal that has at least two communication modules and a number of Subscriber Identity Module (SIM) cards, which is greater than a number of communication modules. When a call is established over a communication network related to a first SIM card, it is determined whether a second SIM card is associated with a first communication module that is associated with the first SIM card. When the second SIM card is associated with the first communication module, SIM association transfer is performed by disassociating the second SIM card from the first communication module and associating the second SIM card with a second communication module, and proceeding to handle the call.

When no second SIM card is associated with the first communication module, it may directly proceed to handle the call without SIM association transfer. When the SIM cards are installed, information of the SIM cards may be distributed among the communication modules for SIM information sharing.

According to another aspect of the present invention, a multi-standby mobile terminal is provided that includes at least two communication modules for communication with multiple communication networks. The multi-standby mobile terminal also includes a plurality of SIM cards, each related to one of the communication networks. A number of SIM cards is greater than a number of the communication modules. The multi-standby mobile terminal further includes a control unit for controlling associations between the SIM cards and the communication modules and for handling calls using the SIM cards. When a call is established over a communication network related to a first SIM card, the control unit determines whether a second SIM card is associated with a first communication module associated with the first SIM card. When the second SIM card is associated with the first communication module associated with the first SIM card, the control unit performs SIM association transfer by disassociating the second SIM card from the first communication module and then associating the second SIM card with a second communication module, and proceeds to handle the call.

When no second SIM card is associated with the first communication module, the control unit may directly proceed to handle the call without SIM association transfer. The multi-standby mobile terminal may further include a memory unit storing information of the SIM cards to be shared among the communication modules when the SIM cards are installed.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar reference symbols may be used throughout the drawings to refer to the same or similar parts. Detailed descriptions of constructions or processes known in the art may be omitted to avoid obscuring the subject matter of the present invention.

The mobile terminal of embodiments of the present invention is a multi-standby mobile terminal that can simultaneously communicate with at least two communication networks, such as CDMA, GSM, WCDMA and Wireless Broadband Internet (WiBro) networks. The mobile terminal is assumed to simultaneously communicate with three communication networks, however, the present invention is not limited thereto. The present invention may be realized with a mobile terminal that has at least two communication modules and a number of SIM cards that is greater than the number of communication modules. Thereby, the mobile terminal may access at least three communication networks at the same time.

Figure 1:
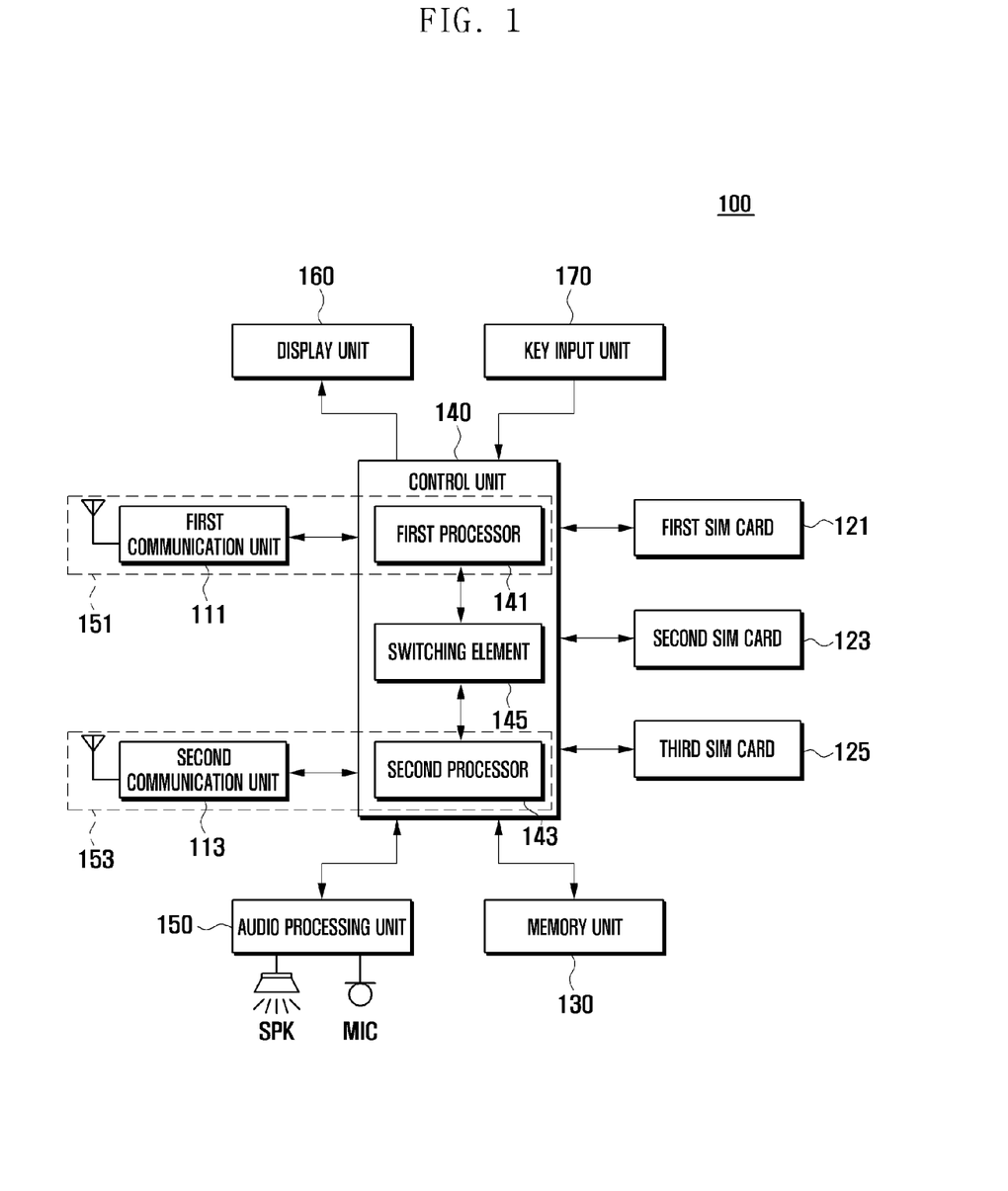
FIG. 1 is a block diagram illustrating a multi-standby mobile terminal, according to an embodiment of the present invention.

FIG. 1 is a block diagram illustrating a multi-standby mobile terminal, according to an embodiment of the present invention. In the following description, the mobile terminal is assumed to be a cellular phone, however, the present invention is not limited thereto.

A mobile terminal 100 includes a first communication unit 111, a second communication unit 113, a first SIM card 121, a second SIM card 123, a third SIM card 125, a memory unit 130, a control unit 140, an audio processing unit 150, a display unit 160, and a key input unit 170. The control unit 140 includes a first processor 141, a second processor 143, and a switching element 145. The first communication unit 111 and the first processor 141 may constitute a first communication module 151, and the second communication unit 113 and the second processor 143 may constitute a second communication module 153.

The first communication unit 111 and the second communication unit 113 perform wireless communication for the mobile terminal 100. Each of the first communication unit 111 and second communication unit 113 connects to at least one communication network, and sends and receives signals according to a communication protocol provided by the communication network. Each of the first communication unit 111 and second communication unit 113 may include a radio frequency transmitter for upconverting the frequency of a signal to be transmitted and amplifying the signal. Each of the first communication unit 111 and the second communication unit 113 may also include a radio frequency receiver for low-noise amplifying a received signal and downconverting the frequency of the received signal.

The first SIM card 121, the second SIM card 123 and the third SIM card 125 support wireless communication for the mobile terminal 100. Specifically, the first SIM card 121, the second SIM card 123 and the third SIM card 125 support communication with respective communication networks. Each of the first SIM card 121, the second SIM card 123 and the third SIM card 125 is a smart card, which stores information necessary for communication with an associated communication network, such as subscriber information, authentication information and communication log information. To manage information, each of the first SIM card 121, the second SIM card 123 and the third SIM card 125 includes a file system composed of a Master File (MF), Dedicated Files (DF) and Elementary Files (EF). The MF corresponds to the root of the file system. The DFs correspond to directories of EFs related to services provided by the communication network. The EFs store subscriber information and authentication information such as subscriber identities and billing records.

Each of the first SIM card 121, the second SIM card 123 and the third SIM card 125 may be installed and removed in and from the mobile terminal 100 through a card contact. The card contact provides an interface between the mobile terminal 100 and the first to third SIM cards 121, 123 and 125.

The memory unit 130 may include a program area and a data area. The program area stores programs for controlling the overall operation of the mobile terminal 100. In particular, the program area stores a program for multi-standby operation. The data area stores data generated through execution of programs. In particular, the data area stores shared information that is needed to access the communication networks through the first communication unit 111 and the second communication unit 113, such as portions of SIM information stored in the first to third SIM cards 121, 123 and 125. The memory unit 130 may store specific elementary files of the SIM information as the shared information.

For example, as to the GSM communication network, the shared information may be composed of files related to International Mobile Subscriber Identity (IMSI), ciphering key (Kc), Home Public Land Mobile Network (HPLMN) search period, HPLMN access technology (HLPMNACT), SIM service table, GPRS ciphering key (KcGPRS), GPRS location information (LOCIGPRS), Operator Controlled PLMN Selector with access technology (OPLMNWACT), Broadcast Command Channels (BCCH), Access Control Class (ACC), Forbidden Public Land Mobile Network (FPLMN), Location Information (LOCI), administrative data (AD), Phase identification (Phase), PLMN, and PLMN access technology (PLMNACT). As to the CDMA communication network, the shared information may be composed of files related to MIN-based International Mobile Subscriber Identity (IMSI_M), "TRUE" International Mobile Subscriber Identity not associated with MIN (IMSI_T), and CDMA service table.

The control unit 140 controls the overall operation of the mobile terminal 100. The control unit 140 includes a data processing module that is composed of a transmitter for encoding and modulating a signal to be transmitted, and a receiver for demodulating and decoding a received signal. The data processing module may include a modulator/demodulator (modem) and a coder/decoder (codec). The codec includes a data codec for processing a packet data, and an audio codec for processing an audio signal such as a voice signal. In particular, the control unit 140 handles multi-standby mode operation. The control unit 140 may make a call through at least one of the first communication unit 111 and second communication unit 113 using at least one of the first SIM card 121, the second SIM card 123 and the third SIM card 125. Specifically, the control unit 140 may perform multi-standby mode operation not only in an idle state but also in a call state.

The first processor 141 and the second processor 143 control wireless communication of the mobile terminal 100. The first processor 141 and the second processor 143 may access at least one communication network through the first communication unit 111 and the second communication unit 113. The first processor 141 and the second processor 143 may connect to the communication network using at least one of the first SIM card 121, the second SIM card 123 and the third SIM card 125, and enter multi-standby mode. The first processor 141 and the second processor 143 may process a signal received through the first communication unit 111 or the second communication unit 113 from at least one communication network. When a call is established through the first communication unit 111 or the second communication unit 113, each of the first processor 141 and the second processor 143 may handle the call using one of the first to third SIM cards 121, 123 and 125.

The switching element 145 controls the connection between the first and second processors 141 and 143 and the first to third SIM cards 121, 123 and 125. The switching element 145 may set up and change a connection between the first and second processors 141 and 143 and the first to third SIM cards 121, 123 and 125. Specifically, the switching element 145 may associate the first SIM card 121 and the second SIM card 123 with the first communication unit 111, and may associate the third SIM card 125 with the second communication unit 113. When a call is established between the first communication unit 111 and a communication network supported by the first SIM card 121, the switching element 145 may perform SIM association transfer by disassociating the second SIM card 123 from the first communication unit 111 and then associating the second SIM card 123 with the second communication unit 113.

The audio processing unit 150 reproduces an audio signal from an audio codec of the data processing module through a speaker (SPK), and sends an input audio signal from a microphone (MIC) to the audio codec of the data processor.

The display unit 160 displays user data from the control unit 140. The display unit 160 may include a panel of Liquid Crystal Display (LCD) devices, LCD controller, and memory device for storing image data to be displayed. If the panel has a touch screen capability, the display unit 160 may also act as an input means.

The key input unit 170 includes a plurality of keys for inputting alphanumeric data, and a plurality of function keys for setting various functions. In particular, the key input unit 170 includes a call key to place a call.

Figure 2:
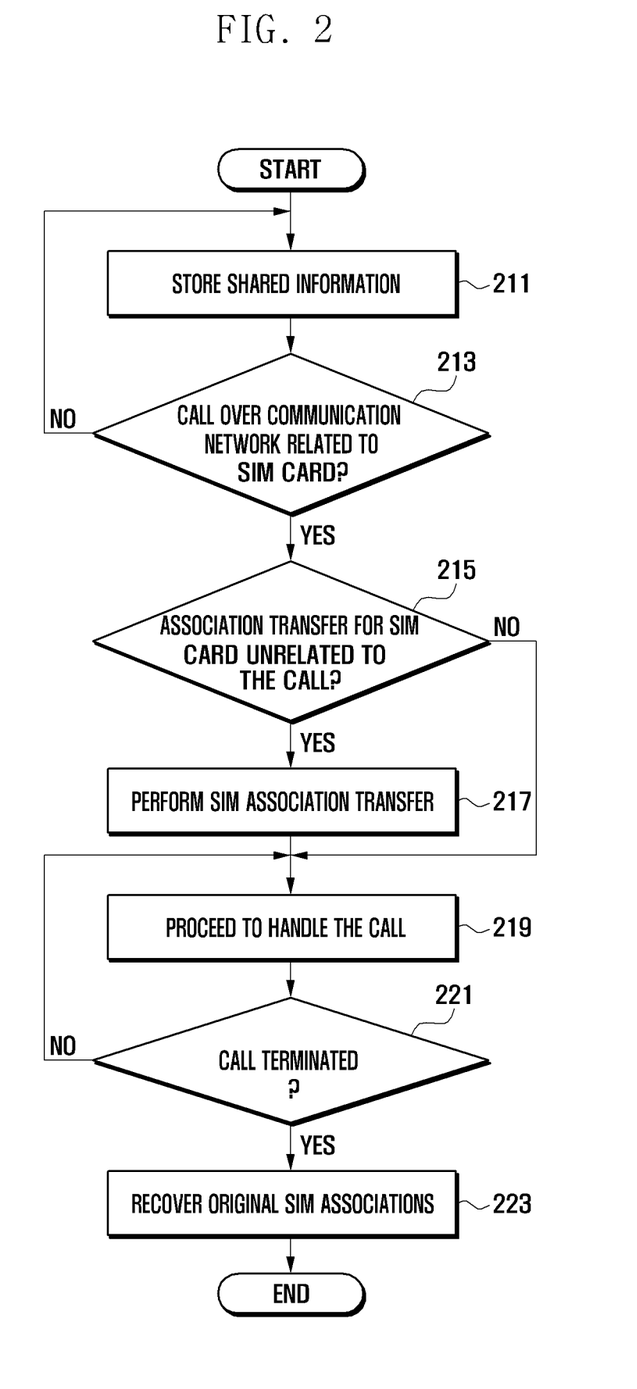
FIG. 2 is a flow chart illustrating an operation method for the multi-standby mobile terminal, according to an embodiment of the present invention.

FIG. 2 is a flow chart of an operation method for the multi-standby mobile terminal, according to an embodiment of the present invention.

The control unit 140 stores specified portions of SIM information stored in the first to third SIM cards 121, 123 and 125 in the memory unit 130 as shared information in step 211. The shared information may correspond to specific elementary files of the SIM information.

In an idle state, the control unit 140 performs triple standby operation by simultaneously accessing communication networks related to the first to third SIM cards 121, 123 and 125. The control unit 140 processes signals from the communication networks related to the first to third SIM cards 121, 123 and 125. For example, when the first SIM card 121 and the second SIM card 123 are associated with the first communication module 151, the control unit 140 uses the first communication module 151 to process signals from the communication networks related to the first SIM card 121 and the second SIM card 123. When the third SIM card 125 is associated with the second communication module 153, the control unit 140 uses the second communication module 153 to process a signal from the communication network related to the second SIM card 123. Later, the control unit 140 may perform a call setup procedure with one of the communication networks related to the first to third SIM cards 121, 123 and 125. Here, the control unit 140 may make a call request to one of the communication networks, or may receive a call request from one of the communication networks.

Figure 3:
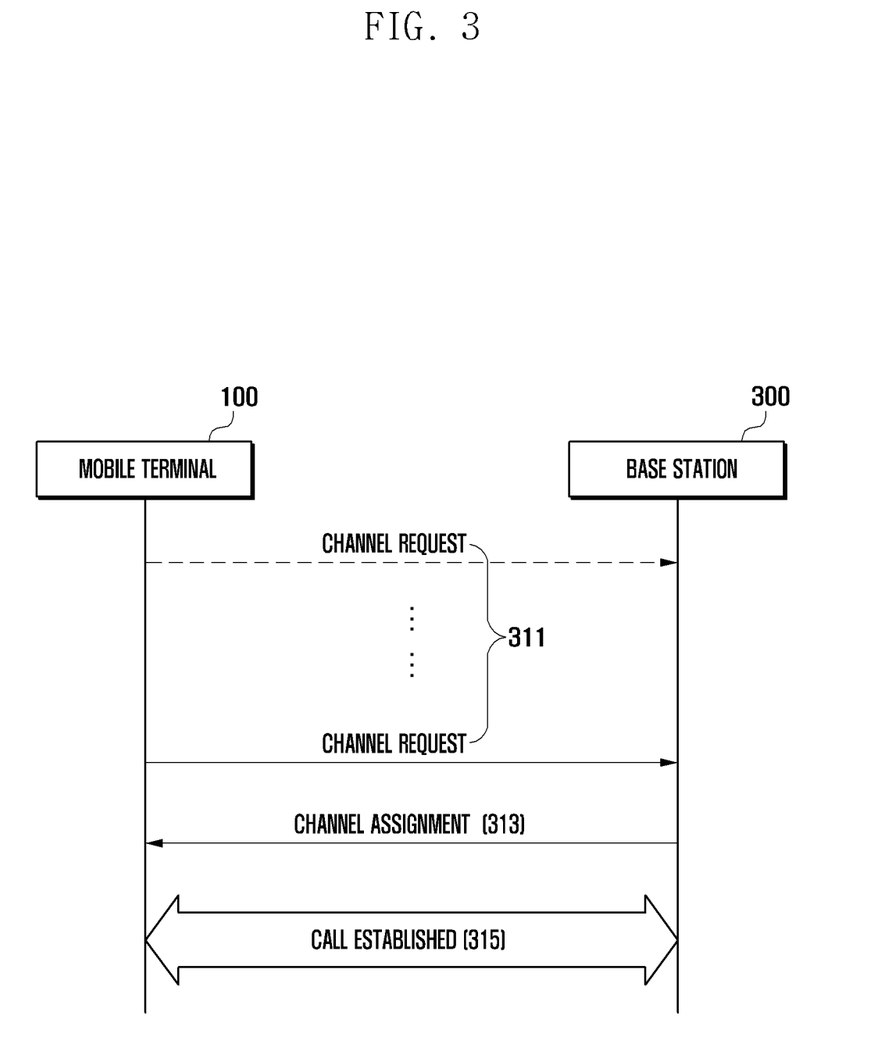
FIG. 3 is a sequence diagram illustrating a call setup procedure in the method of FIG. 2, according to an embodiment of the present invention.

FIG. 3 is a sequence diagram illustrating a call setup procedure in the method of FIG. 2, according to an embodiment of the present invention. FIG. 3 depicts a case in which the control unit 140 makes a call request.

The control unit 140 of the mobile terminal 100 sends a channel request signal to a base station 300 of one of the communication networks related to the first to third SIM cards 121, 123 and 125 in step 311. For example, when the user enters the call key after entering identification information of the recipient such as a phone number, the control unit 140 may send a channel request signal together with the recipient identification information to the base station 300. The control unit 140 may repeatedly send a channel request signal several times. Upon reception of the channel request signal, the base station 300 allocates a channel for a call and sends a channel assignment signal to the mobile terminal 100 as a response in step 313. Upon reception of the channel assignment signal, the control unit 140 of the mobile terminal 100 establishes a call with the base station 300 using the channel indicated by the channel assignment signal in step 315.

Figure 4:
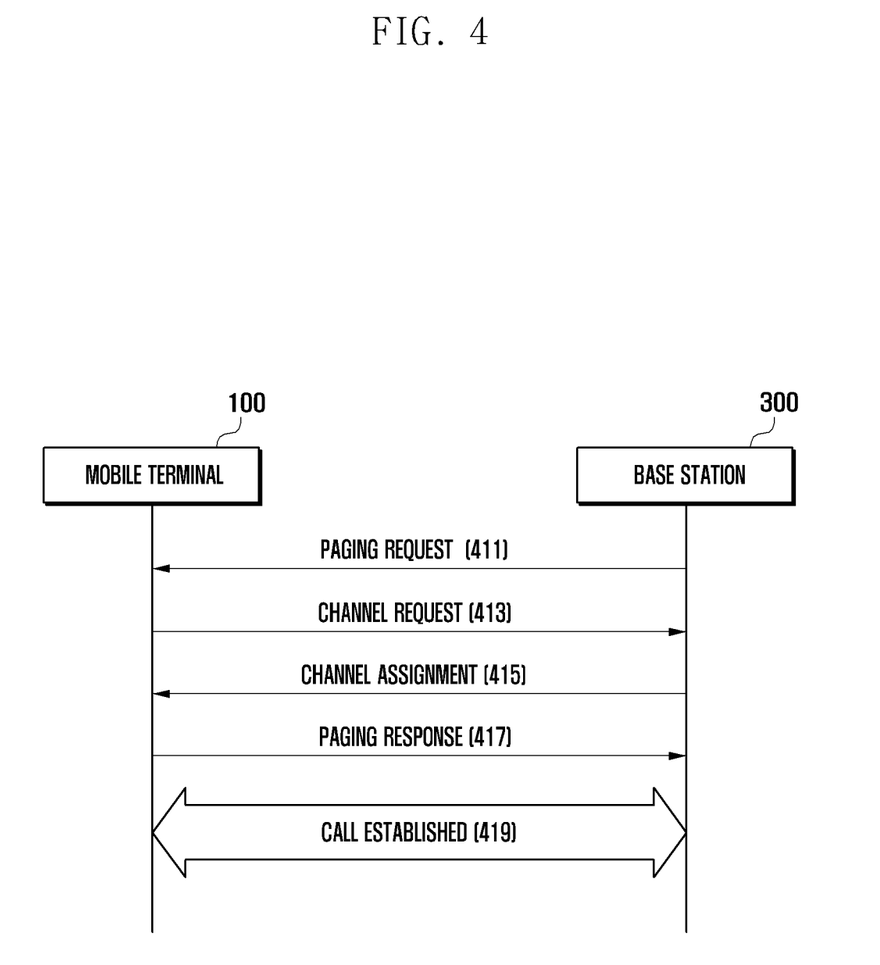
FIG. 4 is a sequence diagram illustrating another call setup procedure in the method of FIG. 2, according to an embodiment of the present invention.

FIG. 4 is a sequence diagram illustrating another call setup procedure in the method of FIG. 2, according to an embodiment of the present invention. FIG. 4 depicts a case in which the control unit 140 receives a call request.

The base station 300 broadcasts a paging request signal to page the mobile terminal 100 in step 411. For example, when another mobile terminal places a call to the mobile terminal 100, the base station 300 broadcasts a paging request signal. Upon reception of the paging request signal, the control unit 140 sends a channel request signal to the base station 300 in step 413. Upon reception of the channel request signal, the base station 300 allocates a channel for a call and sends a channel assignment signal to the mobile terminal 100 as a response in step 415. Upon reception of the channel assignment signal, the control unit 140 sends a paging response signal to the base station 300 in step 417. Upon reception of the paging response signal, the base station 300 establishes a call with the mobile terminal 100 in step 419. Specifically, the control unit 140 establishes a call with the base station 300 using the channel indicated by the channel assignment signal.

Referring back to FIG. 2, the control unit 140 checks whether a call is established with a communication network related to one of the first to third SIM cards 121, 123 and 125 in step 213. When a call is established with a communication network related to one of the first to third SIM cards 121, 123 and 125, the control unit 140 determines the need for SIM association transfer in step 215. For example, when a call is established with the communication network related to the first SIM card 121 being associated with the first communication module 151, the control unit 140 checks whether the second SIM card 123 or the third SIM card 125 is also associated with the first communication module 151. When a call is established with the communication network related to the second SIM card 123 being associated with the second communication module 153, the control unit 140 checks whether the first SIM card 121 or the third SIM card 125 is also associated with the second communication module 153. When a call is established with the communication network related to the third SIM card 125 being associated with the second communication module 153, the control unit 140 checks whether the first SIM card 121 or the second SIM card 123 is also associated with the second communication module 153.

When SIM association transfer is necessary, the control unit 140 performs SIM association transfer in step 217. For example, when a call is established with the communication network related to the first SIM card 121, the control unit 140 may perform SIM association transfer by disassociating the second SIM card 123 from the first communication module 151 and then associating the second SIM card 123 with the second communication module 153. When a call is established with the communication network related to the second SIM card 123, the control unit 140 may perform SIM transfer by disassociating the first SIM card 121 from the first communication module 151 and then associating the first SIM card 121 with the second communication module 153.

The control unit 140 proceeds to handle the call using one of the first to third SIM cards 121, 123 and 125 in step 219. For example, when a call is established with the communication network related to the first SIM card 121, the control unit 140 may handle the call using the first SIM card 121 and the first communication module 151. When a call is established with the communication network related to the second SIM card 121, the control unit 140 may handle the call using the second SIM card 121 and the first communication module 151.

In a call state, the control unit 140 performs triple standby operation by simultaneously accessing the communication networks related to the first to third SIM cards 121, 123 and 125. The control unit 140 processes signals from the communication networks related to the first to third SIM cards 121, 123 and 125. For example, when a call is in progress over the communication network related to the first SIM card 121, the control unit 140 may direct the first communication module 151 to process a signal from the communication network related to the first SIM card 121, and direct the second communication module 153 to process signals from the communication networks related to the second SIM card 123 and the third SIM card 125. When a call is in progress over the communication network related to the second SIM card 123, the control unit 140 may direct the first communication module 151 to process a signal from the communication network related to the second SIM card 123, and direct the second communication module 153 to process signals from the communication networks related to the first SIM card 121 and the third SIM card 125.

When SIM association transfer is not necessary at step 215, the control unit 140 proceeds to handle the call using one of the first to third SIM cards 121, 123 and 125 in step 219. The control unit 140 maintains existing associations between the SIM cards 121, 123 and 125 and the communication modules 151 and 153. For example, when the call is established over the communication network related to the third SIM card 125, the control unit 140 handles the call using the third SIM card 125 and the second communication module 153.

During the call, the control unit 140 performs triple standby operation by simultaneously accessing the communication networks related to the first to third SIM cards 121, 123 and 125. The control unit 140 processes signals from the communication networks related to the first to third SIM cards 121, 123 and 125. For example, when a call is in progress over the communication network related to the third SIM card 125, the control unit 140 may direct the second communication module 153 to process a signal from the communication network related to the third SIM card 125, and direct the first communication module 151 to process signals from the communication networks related to the first SIM card 121 and the second SIM card 123. On the other hand, the control unit 140 may perform a call termination procedure, as described in greater detail below.

Figure 5:
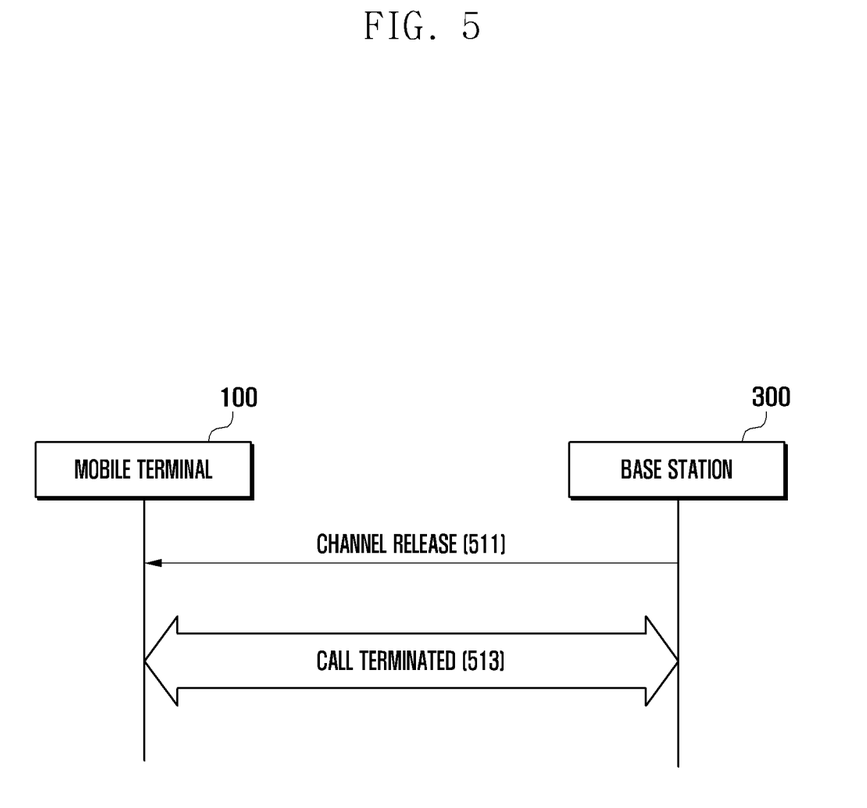
FIG. 5 is a sequence diagram illustrating a call termination procedure in the method of FIG. 2, according to an embodiment of the present invention.

FIG. 5 is a sequence diagram illustrating a call termination procedure in the method of FIG. 2, according to an embodiment of the present invention.

To terminate the call, the base station 300 sends a channel release signal to the mobile terminal 100 and releases the channel allocated to the mobile terminal 100 in step 511. Upon reception of the channel release signal, the control unit 140 ends the call with the base station 300.

Referring back to FIG. 2, when the call is terminated in step 221, the control unit 140 recovers the original associations between the SIM cards 121, 123 and 125 and the communication modules 151 and 153 in step 223. For example, when the first SIM card 121 was disassociated from the first communication module 151 and then associated with the second communication module 153, the control unit 140 disassociates the first SIM card 121 from the second communication module 153 and then associates the same with the first communication module 151. When the second SIM card 123 was disassociated from the first communication module 151 and then associated with the second communication module 153, the control unit 140 disassociates the second SIM card 121 from the second communication module 153 and then associates the same with the first communication module 151.

In the above description, after termination of a call, the control unit 140 recovers the original associations between the SIM cards 121, 123 and 125 and the communication modules 151 and 153. However, the present invention is not limited thereto. Specifically, the control unit 140 may sustain the changed associations between the SIM cards 121, 123 and 125 and the communication modules 151 and 153. For example, when the first SIM card 121 was disassociated from the first communication module 151 and then associated with the second communication module 153, the control unit 140 may maintain the association between the first SIM card 121 and the second communication module 153 after call termination. When the second SIM card 123 was disassociated from the first communication module 151 and then associated with the second communication module 153, the control unit 140 may maintain the association between the second SIM card 123 and the second communication module 153 after call termination.

In the above description, the mobile terminal is depicted as connecting to three communication networks at the same time. However, the present invention is not limited thereto. Specifically, the present invention enables a mobile terminal to simultaneously connect to four or more communication networks. For example, when a call is established with a communication network related to one of the SIM cards, the control unit may associate the SIM card related to the call and one of the communication modules and then associate the SIM cards unrelated to the call with the remaining communication modules. Accordingly, the mobile terminal may perform multi-standby mode operation according to Equation (1). This multi-standby mode operation may be carried out not only in an idle state but also in a call state.

$$S = 2N - 1 \tag{1}$$

S is the number of available SIM cards and N is the number of communication modules in the mobile terminal.

As apparent from the above description, a multi-standby mobile terminal having a number of communication processors less than the number of communication networks to be accessed may perform multi-standby mode operation not only in an idle state but also in a call state. While the multi-standby mobile terminal is engaged in a call with one communication network, it may still receive services from the other communication networks. Hence, it is possible to achieve miniaturization of a multi-standby mobile terminal and effective operation thereof.

While the invention has been shown and described with reference to certained embodiments thereof, it will be understood by those skilled in the art that various changes in form and detail may be made therein without departing from the spirit and scope of the invention as defined by the appended claims.

What is claimed is:

1. An operation method for a multi-standby mobile terminal comprising:
    when a call is established over a communication network related to a first SIM card, determining whether a second SIM card is associated with a first communication module that is associated with the first SIM card; and
    when the second SIM card is associated with the first communication module, SIM association transfer is performed by disassociating the second SIM card from the first communication module and associating the second SIM card with a second communication module, and proceeding to handle the call.

2. The operation method of claim 1, further comprising, when the call is terminated, performing SIM association recovery by disassociating the second SIM card from the second communication module and associating the second SIM card with the first communication module.

3. The operation method of claim 1, further comprising, when the SIM cards are installed, information of the SIM cards is distributed among the communication modules for SIM information sharing.

4. The operation method of claim 1, further comprising, when the second SIM card is not associated with the first communication module, directly proceeding to handle the call without SIM association transfer.

5. The operation method of claim 1, wherein a third SIM card is also associated with the second communication module.

6. A multi-standby mobile terminal comprising:
    at least two communication modules for communication with multiple communication networks;
    a plurality of SIM cards, related to one of the at least two communication includes; and
    a control unit for controlling associations between the plurality of SIM cards and the at least two communication modules and for handling calls using the plurality of SIM cards,
    wherein, when a call is established over a communication network related to a first SIM card, the control unit determines whether a second SIM card is associated with a first communication module that is associated with the first SIM card, when the second SIM card is associated with the first communication module, the control unit performs SIM association transfer by disassociating the second SIM card from the first communication module and associating the second SIM card with a second communication module, and proceeds to handle the call.

7. The multi-standby mobile terminal of claim 6, wherein, when the call is terminated, the control unit performs SIM association recovery by disassociating the second SIM card from the second communication module and then associating the second SIM card with the first communication module.

8. The multi-standby mobile terminal of claim 6, further comprising a memory unit for storing information of the plurality of SIM cards to be shared among the at least two communication modules when the plurality of SIM cards are installed.

9. The multi-standby mobile terminal of claim 6, wherein, when the second SIM card is not associated with the first communication module, the control unit directly proceeds to handle the call without SIM association transfer.

10. The multi-standby mobile terminal of claim 6, wherein a third SIM card is also associated with the second communication module.

11. The multi-standby mobile terminal of claim 6, wherein a number of the plurality of SIM cards is greater than a number of the at least two communication modules.

* * * * *